US012257116B2

(12) United States Patent
Jungnickel et al.

(10) Patent No.: US 12,257,116 B2
(45) Date of Patent: Mar. 25, 2025

(54) METHOD FOR MAKING A HANDLE FOR AN ELECTRICALLY OPERATED PERSONAL CARE IMPLEMENT

(71) Applicant: The Gillette Company LLC, Boston, MA (US)

(72) Inventors: Uwe Jungnickel, Königstein (DE); Martin Brust, Aachen (DE); Marcel Denis Knorr, Frankfurt am Main (DE); Andreas Reuschenbach, Bad Soden (DE); Markus Morgott, Eschborn (DE)

(73) Assignee: The Gillette Company LLC, Boston, MA (US)

( * ) Notice: Subject to any disclaimer, the term of this patent is extended or adjusted under 35 U.S.C. 154(b) by 581 days.

(21) Appl. No.: 17/155,167

(22) Filed: Jan. 22, 2021

(65) Prior Publication Data

US 2021/0220101 A1    Jul. 22, 2021

(30) Foreign Application Priority Data

Jan. 22, 2020   (EP) .................................... 20153084

(51) Int. Cl.
*B29C 45/47* (2006.01)
*A61C 17/22* (2006.01)
(Continued)

(52) U.S. Cl.
CPC ........ *A61C 17/225* (2013.01); *B29C 45/1676* (2013.01); *B29C 45/14336* (2013.01);
(Continued)

(58) Field of Classification Search
CPC .............. A61C 17/225; B29C 45/1676; B29C 45/14336; B29C 45/0001;
(Continued)

(56) References Cited

U.S. PATENT DOCUMENTS

| 3,103,680 A | 9/1963 | Abraham |
| 3,445,966 A | 5/1969 | Moore |

(Continued)

FOREIGN PATENT DOCUMENTS

| CA | 2877731 A1 | 11/2009 |
| CN | 2131361 Y | 5/1993 |

(Continued)

OTHER PUBLICATIONS

CN 105829053 A (Year: 2016).*

(Continued)

*Primary Examiner* — Jeffrey M Wollschlager
*Assistant Examiner* — Guy F Mongelli
(74) *Attorney, Agent, or Firm* — Jay A. Krebs

(57) ABSTRACT

A method for manufacturing a handle for an electrically operated personal care implement comprises the following steps: providing a metal tube housing having a metal wall with an opening therein and an inner surface defining an inner cavity for accommodating an energy source; providing a hard switch component comprising a frame with a recess; attaching the frame of the hard switch component to the inner surface of the metal wall, the frame surrounding the opening and providing an undercut between the recess and the inner surface, the undercut being open towards the opening; and at least partially over-molding the opening to form a soft switch component in the undercut, thereby forming with the hard switch component a switch assembly for activating the energy source, the switch assembly sealing the opening from the inner surface of the metal wall.

14 Claims, 8 Drawing Sheets

(51) Int. Cl.

| | |
|---|---|
| *B29C 45/14* | (2006.01) |
| *B29C 45/16* | (2006.01) |
| *B29C 45/60* | (2006.01) |
| *B29C 45/62* | (2006.01) |
| *B29C 45/74* | (2006.01) |
| *B29C 45/76* | (2006.01) |
| *B29C 65/00* | (2006.01) |
| *B29C 65/48* | (2006.01) |
| *B29L 31/42* | (2006.01) |

(52) U.S. Cl.
CPC ........ B29C 65/48 (2013.01); B29C 66/02245 (2013.01); B29C 66/028 (2013.01); B29C 66/742 (2013.01); B29L 2031/425 (2013.01)

(58) Field of Classification Search
CPC .............. B29C 45/14008; B29C 65/48; B29C 66/02245; B29C 66/028; B29C 66/742; B29C 66/72321; B29L 2031/425
See application file for complete search history.

(56) References Cited

U.S. PATENT DOCUMENTS

| | | | |
|---|---|---|---|
| 3,735,492 A | 5/1973 | Karter | |
| 3,927,435 A | 12/1975 | Moret | |
| 4,384,645 A | 5/1983 | Manfredi | |
| 4,461,053 A | 7/1984 | Nitzsche et al. | |
| 4,811,445 A | 3/1989 | Lagieski et al. | |
| 5,109,563 A | 5/1992 | Lemon et al. | |
| 5,137,039 A | 8/1992 | Klinkhammer | |
| 5,233,891 A | 8/1993 | Arnold | |
| 5,335,389 A | 8/1994 | Curtis et al. | |
| 5,361,446 A | 11/1994 | Rufo | |
| 5,369,835 A | 12/1994 | Clarke | |
| 5,533,429 A | 7/1996 | Kozak | |
| 5,575,443 A | 11/1996 | Honeycutt | |
| 5,815,872 A * | 10/1998 | Meginniss, III ..... A61C 17/222 15/105 | |
| 5,875,510 A | 3/1999 | Lamond et al. | |
| 5,956,796 A | 9/1999 | Lodato | |
| 5,992,423 A | 11/1999 | Tevolini | |
| 5,994,855 A | 11/1999 | Lundell | |
| 6,015,328 A | 1/2000 | Glaser | |
| 6,042,156 A | 3/2000 | Jackson | |
| 6,086,373 A | 7/2000 | Schiff | |
| 6,115,870 A | 9/2000 | Solanki et al. | |
| 6,223,391 B1 | 5/2001 | Kuo | |
| 6,230,716 B1 | 5/2001 | Minoletti | |
| 6,276,019 B1 | 8/2001 | Leversby | |
| 6,308,367 B1 | 10/2001 | Beals et al. | |
| 6,345,406 B1 | 2/2002 | Dodd | |
| 6,546,585 B1 | 4/2003 | Blaustein | |
| 6,643,886 B2 | 11/2003 | Moskovich | |
| 6,671,919 B2 | 1/2004 | Davis | |
| 6,715,211 B1 | 4/2004 | Chi | |
| 6,871,373 B2 | 3/2005 | Driesen | |
| 6,872,325 B2 | 3/2005 | Bandyopadhyay et al. | |
| 6,954,961 B2 | 10/2005 | Ferber et al. | |
| 6,968,590 B2 | 11/2005 | Ponzini | |
| 6,978,504 B1 | 12/2005 | Smith et al. | |
| 7,055,205 B2 | 6/2006 | Aoyama | |
| 7,137,166 B1 | 11/2006 | Kraemer | |
| 7,240,390 B2 | 7/2007 | Pfenniger et al. | |
| 7,458,125 B2 | 12/2008 | Hohlbein | |
| 7,877,832 B2 | 2/2011 | Reinbold | |
| 7,960,473 B2 | 6/2011 | Kobayashi | |
| 8,210,580 B2 | 7/2012 | Engel et al. | |
| 8,308,246 B2 | 11/2012 | Chung | |
| 8,387,197 B2 | 3/2013 | Moskovich | |
| 8,544,131 B2 | 10/2013 | Braun et al. | |
| 8,549,691 B2 | 10/2013 | Moskovich et al. | |
| 8,563,020 B2 | 10/2013 | Uhlmann | |
| 8,701,235 B2 | 4/2014 | Kressner | |
| 8,727,141 B2 | 5/2014 | Akalin | |
| 8,763,189 B2 | 7/2014 | Jungnickel et al. | |
| 8,763,196 B2 | 7/2014 | Kraemer | |
| 8,769,758 B2 | 7/2014 | Jungnickel et al. | |
| 8,800,093 B2 | 8/2014 | Moskovich et al. | |
| 8,931,855 B1 | 1/2015 | Foley et al. | |
| 8,955,185 B2 | 2/2015 | Huy | |
| 8,966,697 B2 | 3/2015 | Kim et al. | |
| 8,985,593 B1 | 3/2015 | Gao | |
| 9,049,921 B1 | 6/2015 | Rackston | |
| 9,066,579 B2 | 6/2015 | Hess | |
| 9,126,346 B2 | 9/2015 | Meier et al. | |
| 9,161,544 B2 | 10/2015 | Agrawal et al. | |
| 9,168,117 B2 | 10/2015 | Yoshida et al. | |
| 9,226,508 B2 | 1/2016 | Uhlmann et al. | |
| 9,265,335 B2 | 2/2016 | Foley et al. | |
| 9,402,461 B2 | 8/2016 | Brik et al. | |
| 9,427,077 B1 | 8/2016 | Zhang | |
| 9,486,066 B2 | 11/2016 | Bresselschmidt | |
| D775,469 S | 1/2017 | Sikora et al. | |
| 9,538,836 B2 | 1/2017 | Mintel et al. | |
| 9,539,750 B2 | 1/2017 | Gross et al. | |
| 9,572,553 B2 | 2/2017 | Post | |
| 9,596,928 B2 | 3/2017 | Pardo et al. | |
| 9,609,940 B2 | 4/2017 | Corbett | |
| 9,635,928 B2 | 5/2017 | Morgott | |
| 9,642,682 B2 | 5/2017 | Kato | |
| 9,737,134 B2 | 8/2017 | Moskovich | |
| 9,775,693 B2 | 10/2017 | Fattori | |
| 9,865,184 B2 | 1/2018 | Jungnickel et al. | |
| D814,195 S | 4/2018 | Sikora et al. | |
| 9,987,109 B2 | 6/2018 | Sokol et al. | |
| 9,993,066 B2 | 6/2018 | Bresselschmidt et al. | |
| 10,021,959 B2 | 7/2018 | Jimenez et al. | |
| 10,021,962 B2 | 7/2018 | Tschol et al. | |
| 10,058,089 B1 | 8/2018 | Stephens | |
| 10,149,532 B2 | 12/2018 | Tschol et al. | |
| 10,182,644 B2 | 1/2019 | Jimenez et al. | |
| 10,189,972 B2 | 1/2019 | Stibor et al. | |
| 10,195,005 B2 | 2/2019 | Wallström et al. | |
| 10,244,855 B2 | 4/2019 | Wechsler | |
| 10,244,857 B2 | 4/2019 | Nelson et al. | |
| 10,314,387 B2 | 6/2019 | Jungnickel et al. | |
| 10,413,390 B2 | 9/2019 | Yao | |
| 10,548,393 B2 | 2/2020 | Xi et al. | |
| 10,561,481 B2 | 2/2020 | Fugger | |
| 10,639,133 B2 | 5/2020 | Bloch et al. | |
| 10,642,228 B1 * | 5/2020 | Cardinali ............... G04G 21/08 | |
| 10,660,430 B2 | 5/2020 | Jimenez et al. | |
| 10,660,733 B2 | 5/2020 | Schaefer et al. | |
| 10,667,892 B2 | 6/2020 | Bärtschi et al. | |
| 10,743,646 B2 | 8/2020 | Jimenez et al. | |
| 10,758,327 B2 | 9/2020 | Katano et al. | |
| 10,792,136 B2 | 10/2020 | May et al. | |
| D901,183 S | 11/2020 | Jungnickel et al. | |
| 10,842,255 B2 | 11/2020 | Görich et al. | |
| 10,874,205 B2 | 12/2020 | Alinski et al. | |
| D912,988 S | 3/2021 | Langhammer | |
| D917,298 S | 4/2021 | Hallein et al. | |
| D926,048 S | 7/2021 | Hallein et al. | |
| D926,049 S | 7/2021 | Hallein et al. | |
| 11,051,605 B2 | 7/2021 | Tschol | |
| D927,972 S | 8/2021 | Hallein et al. | |
| D930,990 S | 9/2021 | Hallein et al. | |
| D931,617 S | 9/2021 | Hallein et al. | |
| D931,619 S | 9/2021 | Hallein et al. | |
| D933,368 S | 10/2021 | Albay et al. | |
| D936,484 S | 11/2021 | Hallein et al. | |
| 11,219,302 B2 | 1/2022 | Alinski et al. | |
| 11,364,102 B2 | 6/2022 | Barnes et al. | |
| 11,375,802 B2 | 7/2022 | Jungnickel | |
| 11,382,409 B2 | 7/2022 | Jungnickel et al. | |
| 11,388,984 B2 | 7/2022 | Jungnickel | |
| 11,388,985 B2 | 7/2022 | Jungnickel et al. | |
| 11,399,622 B2 | 8/2022 | Jungnickel | |
| 11,400,627 B2 | 8/2022 | Jungnickel et al. | |
| 11,425,991 B2 | 8/2022 | Stoerkel et al. | |
| 11,547,116 B2 | 1/2023 | Wingfield et al. | |
| 11,553,782 B2 | 1/2023 | Jungnickel et al. | |

(56) References Cited

U.S. PATENT DOCUMENTS

| | | |
|---|---|---|
| 11,553,784 B2 | 1/2023 | Jungnickel |
| 11,553,999 B2 | 1/2023 | Scherrer et al. |
| 11,571,060 B2 | 2/2023 | Jungnickel |
| 11,659,922 B2 | 5/2023 | Jungnickel |
| 11,672,633 B2 | 6/2023 | Jungnickel et al. |
| 11,684,148 B2 | 6/2023 | Farrell et al. |
| D998,974 S | 9/2023 | Albay |
| 11,865,748 B2 | 1/2024 | Jungnickel |
| D1,019,146 S | 3/2024 | Albay |
| 2001/0035079 A1 | 11/2001 | Kesinger et al. |
| 2003/0077107 A1* | 4/2003 | Kuo .................. A46B 17/08 401/187 |
| 2003/0080474 A1* | 5/2003 | Boland ............... B29C 45/1671 264/494 |
| 2003/0115706 A1 | 6/2003 | Ponzini |
| 2003/0205492 A1 | 11/2003 | Ferber et al. |
| 2004/0016073 A1 | 1/2004 | Knutson |
| 2004/0060138 A1 | 4/2004 | Pfenniger et al. |
| 2004/0187889 A1 | 9/2004 | Kemp et al. |
| 2005/0022322 A1 | 2/2005 | Jimenez et al. |
| 2005/0268414 A1 | 12/2005 | Kim |
| 2005/0286967 A1 | 12/2005 | Blauzdys |
| 2006/0021173 A1 | 2/2006 | Huber |
| 2006/0086370 A1 | 4/2006 | Omeara |
| 2007/0071541 A1* | 3/2007 | Vila ................... A46B 15/0081 401/270 |
| 2007/0222109 A1* | 9/2007 | Pfenniger ................ A46B 7/04 264/241 |
| 2008/0022484 A1 | 1/2008 | Caruso |
| 2008/0120795 A1 | 5/2008 | Reinbold |
| 2008/0183249 A1* | 7/2008 | Kitagawa ........... A46B 15/0022 15/22.1 |
| 2008/0220235 A1 | 9/2008 | Izumi |
| 2009/0089950 A1 | 4/2009 | Moskovich et al. |
| 2009/0144920 A1* | 6/2009 | Nanda ................ A46B 15/0002 15/105 |
| 2010/0115724 A1 | 5/2010 | Huang |
| 2010/0263148 A1 | 10/2010 | Jimenez |
| 2010/0282274 A1 | 11/2010 | Huy |
| 2010/0325828 A1 | 12/2010 | Braun et al. |
| 2011/0016651 A1 | 1/2011 | Piserchio |
| 2011/0047729 A1 | 3/2011 | Iwahori et al. |
| 2011/0146015 A1 | 6/2011 | Moskovich |
| 2011/0225758 A1 | 9/2011 | Chung |
| 2011/0265818 A1 | 11/2011 | Jungnickel et al. |
| 2011/0314677 A1 | 12/2011 | Meier et al. |
| 2012/0036663 A1 | 2/2012 | Chen |
| 2012/0073072 A1 | 3/2012 | Moskovich et al. |
| 2012/0090117 A1 | 4/2012 | Akalin |
| 2012/0096665 A1 | 4/2012 | Ponzini |
| 2012/0112566 A1 | 5/2012 | Doll |
| 2012/0192366 A1* | 8/2012 | Cobabe .................. A46B 7/04 15/4 |
| 2012/0198640 A1 | 8/2012 | Jungnickel et al. |
| 2012/0227200 A1 | 9/2012 | Kraemer |
| 2012/0272923 A1 | 11/2012 | Stephens |
| 2012/0301528 A1 | 11/2012 | Uhlmann |
| 2012/0301530 A1 | 11/2012 | Uhlmann et al. |
| 2012/0301531 A1 | 11/2012 | Uhlmann et al. |
| 2012/0301533 A1 | 11/2012 | Uhlmann et al. |
| 2013/0000059 A1 | 1/2013 | Jungnickel et al. |
| 2013/0000061 A1 | 1/2013 | Park |
| 2013/0171225 A1 | 7/2013 | Uhlmann et al. |
| 2013/0291326 A1 | 11/2013 | Mintel |
| 2013/0308994 A1* | 11/2013 | Wu ..................... A46B 11/002 401/188 R |
| 2013/0315972 A1 | 11/2013 | Krasnow et al. |
| 2014/0012165 A1 | 1/2014 | Cockley |
| 2014/0137349 A1 | 5/2014 | Newman |
| 2014/0151931 A1 | 6/2014 | Altonen et al. |
| 2014/0259474 A1 | 9/2014 | Sokol et al. |
| 2014/0359957 A1 | 12/2014 | Jungnickel |
| 2014/0359958 A1 | 12/2014 | Jungnickel |
| 2014/0359959 A1 | 12/2014 | Jungnickel et al. |
| 2014/0371729 A1 | 12/2014 | Post |
| 2015/0010765 A1 | 1/2015 | Munro |
| 2015/0034858 A1 | 2/2015 | Raman |
| 2015/0107423 A1 | 4/2015 | Martn |
| 2015/0128367 A1 | 5/2015 | Jungnickel et al. |
| 2015/0143651 A1 | 5/2015 | Foley et al. |
| 2015/0147372 A1 | 5/2015 | Agrawal et al. |
| 2015/0170811 A1 | 6/2015 | Tanigawa et al. |
| 2015/0173502 A1 | 6/2015 | Sedic |
| 2015/0245618 A9 | 9/2015 | Agrawal et al. |
| 2015/0289635 A1 | 10/2015 | Erskine-Smith |
| 2015/0305487 A1 | 10/2015 | Pardo et al. |
| 2015/0351406 A1 | 12/2015 | Wingfield et al. |
| 2016/0081465 A1 | 3/2016 | Metter |
| 2016/0135579 A1 | 5/2016 | Tschol et al. |
| 2016/0135580 A1 | 5/2016 | Tschol et al. |
| 2016/0220012 A1* | 8/2016 | Sprosta .................. A46B 11/00 |
| 2016/0220014 A1 | 8/2016 | Sprosta |
| 2016/0338807 A1 | 11/2016 | Bloch |
| 2017/0020277 A1 | 1/2017 | Barnes et al. |
| 2017/0079418 A1 | 3/2017 | Mintel |
| 2017/0333172 A1* | 11/2017 | Zheng .................. A61C 17/225 |
| 2017/0347782 A1 | 12/2017 | Jimenez et al. |
| 2017/0347786 A1 | 12/2017 | Jimenez et al. |
| 2017/0367469 A1 | 12/2017 | Jimenez et al. |
| 2018/0016408 A1 | 1/2018 | Stibor et al. |
| 2018/0035797 A1 | 2/2018 | Mahawar |
| 2018/0055206 A1 | 3/2018 | Nelson et al. |
| 2018/0064516 A1 | 3/2018 | Wu |
| 2018/0092449 A1 | 4/2018 | Straka et al. |
| 2018/0110601 A1* | 4/2018 | Mighall ............... A61C 17/222 |
| 2018/0140404 A1* | 5/2018 | Schaefer ................ A61C 17/34 |
| 2018/0168326 A1 | 6/2018 | Davies-Smith et al. |
| 2018/0235355 A1 | 8/2018 | Jungnickel et al. |
| 2018/0311023 A1 | 11/2018 | Yao |
| 2019/0000223 A1 | 1/2019 | Alinski |
| 2019/0029787 A1 | 1/2019 | Zhou |
| 2019/0069978 A1 | 3/2019 | Katano et al. |
| 2019/0117356 A1 | 4/2019 | Bärtschi et al. |
| 2019/0174906 A1 | 6/2019 | Bloch |
| 2019/0175320 A1 | 6/2019 | Bloch et al. |
| 2019/0200740 A1 | 7/2019 | Jungnickel |
| 2019/0200742 A1 | 7/2019 | Jungnickel |
| 2019/0200743 A1 | 7/2019 | Jungnickel |
| 2019/0200748 A1 | 7/2019 | Görich |
| 2019/0201745 A1* | 7/2019 | McCarthy ............... A63B 31/11 |
| 2019/0246779 A1 | 8/2019 | Jungnickel et al. |
| 2019/0246780 A1 | 8/2019 | Jungnickel et al. |
| 2019/0246781 A1 | 8/2019 | Jungnickel et al. |
| 2019/0248049 A1 | 8/2019 | Jungnickel et al. |
| 2019/0351463 A1* | 11/2019 | Wupendram ........ A46B 5/0095 |
| 2020/0022793 A1 | 1/2020 | Scherrer et al. |
| 2020/0031038 A1* | 1/2020 | Rodriguez Outon ... B29C 48/48 |
| 2020/0077778 A1 | 3/2020 | Jungnickel |
| 2020/0121069 A1 | 4/2020 | Jungnickel |
| 2020/0305588 A1 | 10/2020 | Jungnickel |
| 2020/0391371 A1 | 12/2020 | Nelson |
| 2021/0120948 A1 | 4/2021 | Görich et al. |
| 2021/0128286 A1* | 5/2021 | Jungnickel ............ B26B 21/528 |
| 2021/0145162 A1 | 5/2021 | Baertschi |
| 2021/0212446 A1 | 7/2021 | Jungnickel |
| 2021/0212447 A1 | 7/2021 | Jungnickel et al. |
| 2021/0212448 A1 | 7/2021 | Jungnickel |
| 2021/0259818 A1 | 8/2021 | Jungnickel et al. |
| 2021/0307496 A1 | 10/2021 | Jungnickel et al. |
| 2021/0315368 A1 | 10/2021 | Jungnickel |
| 2021/0315369 A1 | 10/2021 | Jungnickel |
| 2021/0315370 A1 | 10/2021 | Jungnickel |
| 2021/0315675 A1 | 10/2021 | Jungnickel |
| 2022/0142344 A1 | 5/2022 | Jungnickel |
| 2022/0142345 A1 | 5/2022 | Jungnickel |
| 2022/0142346 A1 | 5/2022 | Jungnickel |
| 2022/0142347 A1 | 5/2022 | Jungnickel |
| 2022/0143854 A1 | 5/2022 | Jungnickel |
| 2022/0143884 A1 | 5/2022 | Jungnickel |
| 2022/0145075 A1 | 5/2022 | Jungnickel |
| 2022/0146024 A1 | 5/2022 | Lin |

(56) References Cited

U.S. PATENT DOCUMENTS

| | | | |
|---|---|---|---|
| 2022/0152891 | A1 | 5/2022 | Jungnickel et al. |
| 2022/0408907 | A1 | 12/2022 | Zwimpfer |

FOREIGN PATENT DOCUMENTS

| | | | |
|---|---|---|---|
| CN | 2320102 | | 5/1999 |
| CN | 1223834 | | 7/1999 |
| CN | 1229341 | A | 9/1999 |
| CN | 1229622 | | 9/1999 |
| CN | 2346277 | | 11/1999 |
| CN | 1241123 | A | 1/2000 |
| CN | 201036392 | | 3/2008 |
| CN | 201185740 | | 1/2009 |
| CN | 201563874 | U | 9/2010 |
| CN | 201630520 | | 11/2010 |
| CN | 201675294 | | 12/2010 |
| CN | 201861064 | | 6/2011 |
| CN | 201861068 | | 6/2011 |
| CN | 201949160 | U | 8/2011 |
| CN | 202035662 | | 11/2011 |
| CN | 202269590 | U | 6/2012 |
| CN | 202286879 | | 7/2012 |
| CN | 202476817 | | 10/2012 |
| CN | 202566900 | U | 12/2012 |
| CN | 102907880 | | 2/2013 |
| CN | 102948997 | | 3/2013 |
| CN | 202820100 | | 3/2013 |
| CN | 202843252 | U | 4/2013 |
| CN | 202941615 | | 5/2013 |
| CN | 202959287 | U | 6/2013 |
| CN | 202980745 | | 6/2013 |
| CN | 103829559 | | 6/2014 |
| CN | 103844575 | | 6/2014 |
| CN | 104768420 | A | 7/2015 |
| CN | 105054571 | | 11/2015 |
| CN | 105411165 | A | 3/2016 |
| CN | 205082879 | | 3/2016 |
| CN | 105534002 | | 5/2016 |
| CN | 205198181 | U | 5/2016 |
| CN | 105750734 | | 7/2016 |
| CN | 105818322 | | 8/2016 |
| CN | 105829053 | A * | 8/2016 ............... A46B 5/02 |
| CN | 205568222 | | 9/2016 |
| CN | 106132244 | A | 11/2016 |
| CN | 106793866 | A | 5/2017 |
| CN | 206714397 | | 12/2017 |
| CN | 207055161 | | 3/2018 |
| CN | 109259882 | A | 1/2019 |
| CN | 111713845 | A | 9/2020 |
| DE | 3241118 | A1 | 8/1984 |
| DE | 4412301 | A1 | 10/1995 |
| DE | 202005002964 | | 7/2005 |
| DE | 202006019788 | | 8/2007 |
| DE | 102006051649 | | 5/2008 |
| DE | 202013001159 | U1 | 3/2013 |
| DE | 202015002964 | U1 | 8/2015 |
| EP | 0100975 | A2 | 2/1984 |
| EP | 0423510 | A1 | 4/1991 |
| EP | 0481553 | A1 | 4/1992 |
| EP | 2117395 | A2 | 11/2009 |
| EP | 2218559 | A1 | 8/2010 |
| EP | 2229917 | A1 | 9/2010 |
| EP | 3090646 | | 11/2016 |
| EP | 3381404 | A1 | 10/2018 |
| EP | 3501333 | A1 | 6/2019 |
| FR | 2835176 | | 8/2003 |
| GB | 766486 | | 1/1957 |
| GB | 2493409 | | 2/2013 |
| GB | 2556019 | A | 5/2018 |
| IN | 201817043186 | A | 11/2018 |
| JP | 61020509 | | 1/1986 |
| JP | S63284262 | | 11/1988 |
| JP | H05305010 | A | 11/1993 |
| JP | H0669408 | | 3/1994 |
| JP | 2561978 | | 12/1996 |
| JP | 2619825 | | 6/1997 |
| JP | H1199016 | A | 4/1999 |
| JP | 2003009951 | | 1/2003 |
| JP | 2003245132 | | 9/2003 |
| JP | 2004089471 | | 3/2004 |
| JP | 2005053973 | | 3/2005 |
| JP | 4076405 | | 2/2008 |
| JP | 2009011621 | | 1/2009 |
| JP | 2011045621 | | 3/2011 |
| JP | 2011087747 | | 5/2011 |
| JP | 2015231500 | A | 12/2015 |
| JP | 3206625 | B2 | 9/2016 |
| JP | 6160619 | B2 | 6/2017 |
| JP | 3213325 | | 11/2017 |
| KR | 20060042059 | A | 5/2006 |
| KR | 20070013844 | | 1/2007 |
| KR | 20090030829 | | 3/2009 |
| KR | 20100043124 | A | 4/2010 |
| KR | 101142611 | | 5/2012 |
| KR | 20130006243 | U | 10/2013 |
| KR | 101339558 | | 12/2013 |
| KR | 200473116 | | 6/2014 |
| KR | 20150057308 | | 5/2015 |
| KR | 20150105813 | | 9/2015 |
| KR | 20160000035 | A | 1/2016 |
| KR | 101591299 | | 2/2016 |
| KR | 20160121554 | A | 10/2016 |
| KR | 20160125725 | | 11/2016 |
| KR | 20170062779 | | 6/2017 |
| KR | 101847473 | B1 | 4/2018 |
| KR | 200486759 | Y1 | 6/2018 |
| KR | 101987341 | B1 | 6/2019 |
| RU | 2141238 | | 11/1999 |
| WO | 9510959 | | 4/1995 |
| WO | 9838889 | | 9/1998 |
| WO | 9844823 | A2 | 10/1998 |
| WO | 2005002826 | A1 | 1/2005 |
| WO | 2005030002 | | 4/2005 |
| WO | 200641658 | | 4/2006 |
| WO | 2008052210 | A2 | 5/2008 |
| WO | 2008052250 | A1 | 5/2008 |
| WO | 2008098107 | A2 | 8/2008 |
| WO | 2009045982 | A1 | 4/2009 |
| WO | 2011075133 | A1 | 6/2011 |
| WO | 2012126126 | | 9/2012 |
| WO | 2012144328 | | 10/2012 |
| WO | 2013076904 | | 5/2013 |
| WO | 2013101300 | A1 | 7/2013 |
| WO | 2013158741 | | 10/2013 |
| WO | 2013172834 | A1 | 11/2013 |
| WO | 2014193621 | | 12/2014 |
| WO | 2014197293 | A1 | 12/2014 |
| WO | 2015061651 | A1 | 4/2015 |
| WO | 2016189407 | A1 | 12/2016 |
| WO | 2017139256 | A1 | 8/2017 |
| WO | 2017155033 | A1 | 9/2017 |
| WO | 2017173768 | A1 | 10/2017 |
| WO | 2018025751 | | 2/2018 |
| WO | 2019072925 | A1 | 4/2019 |
| WO | 2019157787 | A1 | 8/2019 |

OTHER PUBLICATIONS

All Office Actions; U.S. Appl. No. 16/225,509, filed on Dec. 19, 2018.

All Office Actions; U.S. Appl. No. 16/225,592, filed on Dec. 19, 2018.

All Office Actions; U.S. Appl. No. 16/225,688, filed on Dec. 19, 2018.

All Office Actions; U.S. Appl. No. 16/225,809, filed on Dec. 19, 2018.

All Office Actions; U.S. Appl. No. 16/272,392, filed on Feb. 11, 2019.

All Office Actions; U.S. Appl. No. 16/272,422, filed on Feb. 11, 2019.

All Office Actions; U.S. Appl. No. 16/272,872, filed Feb. 11, 2019.

All Office Actions; U.S. Appl. No. 16/272,943, filed Feb. 11, 2019.

(56) References Cited

OTHER PUBLICATIONS

All Office Actions; U.S. Appl. No. 16/551,307, filed Aug. 26, 2019.
All Office Actions; U.S. Appl. No. 16/551,399, filed Aug. 26, 2019.
All Office Actions; U.S. Appl. No. 17/077,639, filed Oct. 22, 2020.
All Office Actions; U.S. Appl. No. 17/090,980, filed Jun. 11, 2020.
All Office Actions; U.S. Appl. No. 17/155,208, filed Jan. 22, 2021.
All Office Actions; U.S. Appl. No. 17/218,573, filed Mar. 31, 2021.
All Office Actions; U.S. Appl. No. 17/218,742, filed Mar. 31, 2021.
All Office Actions; U.S. Appl. No. 17/219,989, filed Apr. 1, 2021.
All Office Actions; U.S. Appl. No. 17/225,259, filed Apr. 8, 2021.
All Office Actions; U.S. Appl. No. 17/225,283, filed Apr. 8, 2021.
All Office Actions; U.S. Appl. No. 17/225,296, filed Apr. 8, 2021.
All Office Actions; U.S. Appl. No. 17/225,411, filed Apr. 8, 2021.
All Office Actions; U.S. Appl. No. 17/354,027, filed Jun. 22, 2021.
All Office Actions; U.S. Appl. No. 17/462,089, filed Aug. 31, 2021.
All Office Actions; U.S. Appl. No. 17/511,103, filed Oct. 26, 2021.
All Office Actions; U.S. Appl. No. 17/517,928, filed Nov. 3, 2021.
All Office Actions; U.S. Appl. No. 17/517,937, filed Nov. 3, 2021.
All Office Actions; U.S. Appl. No. 17/517,957, filed Nov. 3, 2021.
All Office Actions; U.S. Appl. No. 17/517,975, filed Nov. 3, 2021.
All Office Actions; U.S. Appl. No. 17/517,990, filed Nov. 3, 2021.
All Office Actions; U.S. Appl. No. 17/517,999, filed Nov. 3, 2021.
All Office Actions; U.S. Appl. No. 17/518,009, filed Nov. 3, 2021.
All Office Actions; U.S. Appl. No. 16/829,585, filed Mar. 25, 2020.
Extended European Search Report and Search Opinion; Application No 20153084.7; dated Jul. 14, 2020, 5 pages.
CM05151Q PCT Search Report and Written Opinion for PCT/US2021/070036 dated May 3, 2021, 11 pages.
Unpublished U.S. Appl. No. 17/462,089, filed Oct. 31, 2021, to first inventor et al.
Unpublished U.S. Appl. No. 17/511,103, filed Oct. 26, 2021, to first inventor et al.
Unpublished U.S. Appl. No. 17/517,928, filed Nov. 3, 2021, to first inventor et al.
Unpublished U.S. Appl. No. 17/517,937, filed Nov. 3, 2021, to first inventor et al.
Unpublished U.S. Appl. No. 17/517,957, filed Nov. 3, 2021, to first inventor et al.
Unpublished U.S. Appl. No. 17/517,975, filed Nov. 3, 2021, to first inventor et al.
Unpublished U.S. Appl. No. 17/517,990, filed Nov. 3, 2021, to first inventor et al.
Unpublished U.S. Appl. No. 17/517,999, filed Nov. 3, 2021, to first inventor et al.
Unpublished U.S. Appl. No. 17/518,009, filed Nov. 3, 2021, to first inventor et al.
U.S. Appl. No. 29/746,709, filed Aug. 17, 2020, Christine Hallein et al.
U.S. Appl. No. 29/659,068, filed Aug. 6, 2020, Christine Hallein et al.
U.S. Appl. No. 29/787,707, filed Jun. 8, 2021, Uwe Jungnickel et al.
U.S. Appl. No. 29/746,718, filed Aug. 17, 2020, Dominik Langhammer.
U.S. Appl. No. 29/757,499, filed Nov. 6, 2020, Christine Hallein et al.
U.S. Appl. No. 29/752,903, filed Sep. 29, 2020, Uwe Jungnickel et al..
U.S. Appl. No. 29/752,912, filed Sep. 29, 2020, Uwe Jungnickel et al..
U.S. Appl. No. 29/762,793, filed Dec. 18, 2020, Uwe Jungnickel et al..
U.S. Appl. No. 29/787,712, filed Jun. 8, 2021, Uwe Jungnickel et al..
U.S. Appl. No. 29/699,695, filed Jul. 29, 2019, Niclas Altmann et al.
U.S. Appl. No. 29/743,560, filed Jul. 22, 2020, Devran Albay et al.
U.S. Appl. No. 29/758,268, filed Nov. 13, 2020, Devran Albay et al.
U.S. Appl. No. 29/758,249, filed Nov. 13, 2020, Devran Albay et al.
U.S. Appl. No. 29/758,251, filed Nov. 13, 2020, Devran Albay et al.
U.S. Appl. No. 29/758,276, filed Nov. 13, 2020, Devran Albay et al.
U.S. Appl. No. 29/758,274, filed Nov. 13, 2020, Devran Albay et al.
U.S. Appl. No. 29/786,732, filed Jun. 2, 2021, Devran Albay et al.
U.S. Appl. No. 29/786,746, filed Jun. 2, 2021, Devran Albay et al.
U.S. Appl. No. 29/782,323, filed May 6, 2021, Christine Hallein et al.
U.S. Appl. No. 29/819,318, filed Dec. 14, 2021, Devran Albay et al.
U.S. Appl. No. 29/814,060, filed Nov. 3, 2021, Christine Hallein et al.
U.S. Appl. No. 29/814,616, filed Nov. 8, 2021, Christine Hallein et al.
"Spring Plungers push fit stainless steel", KIPP, Aug. 9, 2015, 1 page.
"Steel and Stainless Steel Press Fit Ball Plunger with Stainless Ball", Northwestern Tools, Mar. 12, 2016, 1 page.
All Office Actions; U.S. Appl. No. 18/361,100, filed Jul. 28, 2023.
Unpublished U.S. Appl. No. 18/361,100, filed Jul. 28, 2023 to Uwe Jungnickel et al.
"The Proven Material for Metal Replacement", Grivory GV, Provided by EMS-Grivory, year 2014, 36 pages.
Erik Gregersen, "Compounds", Britannica, Iron—Compounds, Allotropes, Reactions, Retrieved from Internet: https://www.britannica.com/science/iron-chemicalelement/Compounds#ref93312, Year 2007, 3 pages.
Jaime Aparecido Cury et al., "The Importance of Fluoride Dentifrices to the Current Dental Caries Prevalence in Brazil", Faculty of Dentistry of Piracicaba, Nov. 24, 2004, pp. 167-174.
Unpublished U.S. Appl. No. 18/524,201, filed Nov. 30, 2023 to Uwe Jungnickel et al.
Density of Plastic Materials, Online retrieved from "https://omnexus.specialchem.com/polymer-property/density", 2024, 12 Pages.
CAEtool, Density of Materials, Retrieved from Internet: https://caetool.com/2017/10/12/p0016/, Dec. 12, 2022, 3 pages.
All Office Actions; U.S. Appl. No. 18/100,730, filed on Jan. 24, 2023.
Unpulished U.S. Appl. No. 18/100,730, filed on Jan. 24, 2023 to Gerald Görich et al.

\* cited by examiner

METHOD FOR MAKING A HANDLE FOR AN ELECTRICALLY OPERATED PERSONAL CARE IMPLEMENT

FIELD OF THE INVENTION

The present disclosure is concerned with a method for manufacturing a handle for an electrically operated personal care implement. The present disclosure is further concerned with a handle for an electrically operated personal care implement manufactured by such method.

BACKGROUND OF THE INVENTION

Personal care implements, like toothbrushes, are well known in the art. Generally, tufts of bristles for cleaning teeth are attached to a bristle carrier or mounting surface of a brush head intended for insertion into a user's oral cavity. A handle is usually attached to the head, which handle is held by the user during brushing. Usually, heads of manual toothbrushes are permanently connected to the handle, e.g. by injection molding the bristle carrier, the handle, a neck connecting the head and the handle, in one injection molding step. After the usual lifetime of a toothbrush, i.e. after about three months of usage, the toothbrush is discarded. In order to provide environmentally friendly/sustainable toothbrushes generating less waste when the brushes are discarded, manual and electrically operated toothbrushes are known comprising heads or head refills being exchangeable, i.e. repeatedly attachable to and detachable from the handle. Instead of buying a completely new toothbrush, consumers can re-use the handle and buy a new head refill only.

Electrically operated toothbrushes exhibit the advantage that they assist users during brushing and may facilitate improved cleansing of the teeth and gums, in particular in hard to reach areas in the mouth. Typically, handles for electrical, handheld devices comprise a housing made from plastic materials to accommodate an energy source, e.g. a battery. While the housing itself is usually molded out of a hard-plastic material, e.g. PP (polypropylene) or ABS (acrylonitrile butadiene styrene), a switch area for operating the electrical device is molded out of a soft elastomeric material, e.g. TPE (thermoplastic elastomer), thereby forming a substantially waterproof membrane that allows actuation of a switch located within the housing. However, in order to allow for a substantially waterproof sealing and sufficient bonding between the switch and the housing by over-molding of a soft component (that forms the switch) on the hard-plastic housing, specific material combinations and geometries of the bonding area have to be selected.

However, it has been found out that for premium personal care products it is a special consumer delight, if the outer housing is not made from plastic material but from real metal. Beside higher value impression of metal vs. plastic, a metal housing has the advantage that a much thinner wall of the housing can be provided, while still ensuring high durability and stability of the housing. Further, a slimmer overall product design can be provided.

It has been found out that such metal housings bring new challenge in creating a waterproof switch area. Due to the relatively thin wall thickness and reduced freedom in designing the housing (the metal housing is not freeformed as usual plastic parts, but have the form of a simple metal tube), the bonding area between the components is limited and a let-in flush switch area/element cannot be simply overmolded onto the housing. The bonding force between the switch area/element and the metal tube is not sufficient to withstand regular stress occurring during use of the switch. Peel stress in the bonding area weakens the bonding connection which may result in gaps allowing water entering the inner part of the housing. A durable waterproof handle housing cannot be provided by such design.

It is an object of the present disclosure to provide a method for manufacturing a handle for an electrically operated personal care implement, e.g. a handle for a toothbrush, which overcomes at least one of the above-mentioned drawbacks. It is also an object of the present disclosure to provide a handle for a personal care implement manufactured by such method.

SUMMARY OF THE INVENTION

In accordance with one aspect, a method for manufacturing a handle for an electrically operated personal care implement is provided, the method comprising the following steps:
 providing a metal tube housing, the housing having a metal wall with an opening therein and an inner surface, the inner surface defining an inner cavity for accommodating an energy source,
 providing a hard switch component comprising a frame with a recess,
 attaching the frame of the hard switch component to the inner surface of the metal wall, the frame surrounding the opening and providing an undercut between the recess and the inner surface, the undercut being open towards the opening,
 at least partially over-molding the opening to form a soft switch component, the soft switch component being accommodated in the undercut thereby forming with the hard switch component a switch assembly for activating the energy source, the switch assembly sealing the opening from the inner surface of the metal wall.

In accordance with one aspect a handle for an electrically operated personal care implement is provided, the handle being manufactured according to such process.

BRIEF DESCRIPTION OF THE DRAWINGS

The invention is described in more detail below with reference to various embodiments and figures, wherein.

DETAILED DESCRIPTION OF THE INVENTION

Figure 1:
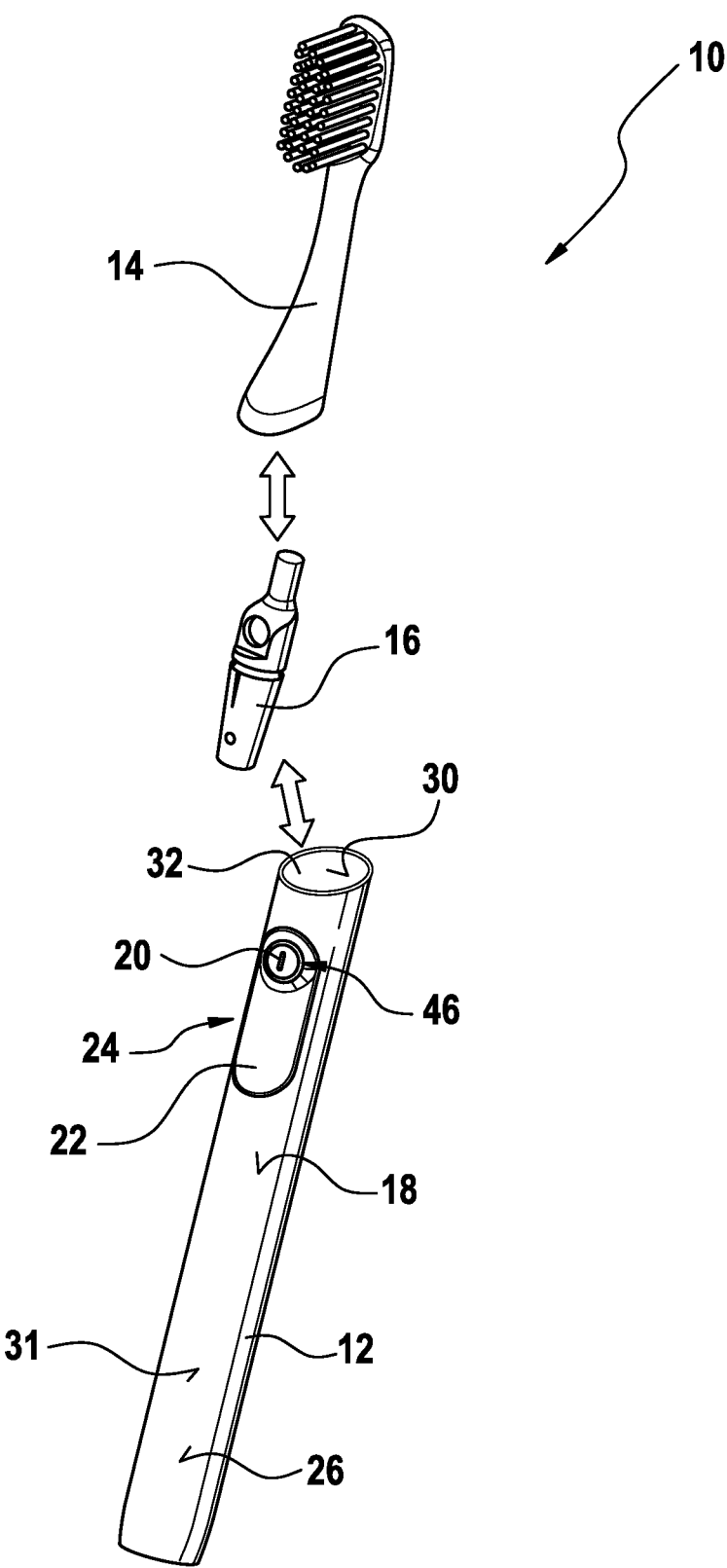
FIG. 1 shows a perspective view of an example embodiment of an oral care implement according to the present disclosure, the implement comprising a handle having a metal tube housing and a switch assembly.

The method for manufacturing a handle for an electrically operated personal care implement comprises the provision of a metal tube housing, the housing having a metal wall with an opening therein and an inner surface, the inner surface defining an inner cavity for accommodating an energy source for operating the personal care implement. The opening, e.g. a cut-out which may be provided by laser cutting, to accommodate a switch assembly for activating the energy source, i.e. for switching the electronically operated personal care implement to an ON/OFF status. Said switch assembly for operating the implement comprises a hard switch component and a soft switch component; the hard switch component comprises a frame with a recess.

In order to provide the metal tube housing with the switch assembly, the method according to the present disclosure comprises: providing a hard switch component comprising a frame with a recess, and attaching the frame of the hard switch component to the inner surface of the metal wall, the frame surrounding the opening and providing an undercut between the recess and the inner surface, the undercut being open towards the opening. The frame of the hard switch component surrounding the opening provides an undercut which is open towards the opening so that a portion of the soft switch component can be accommodated therein. The soft switch component is provided by at least partially over-molding the opening from the outside of the housing, thereby forming the switch assembly. The switch assembly seals the opening from the inner surface of the metal wall, preferably in a substantially waterproof manner.

In the method according to the present disclosure, the metal tube housing with the hard switch component attached thereto may be inserted into an injection mold before the soft switch component will be over-molded. Said injection mold may comprise a mold insert having a hardness being lower than the hardness of the metal tube material itself to avoid any damage to the metal tube housing during the closure of the mold. For example, the mold insert may be made from brass or from a soft elastic material. The insert may be provided at least in the area where the mold touches the metal tube.

Typical housings for electrical, handheld devices according to the art are usually made from plastic materials. While the housing itself is molded out of hard-plastic material, like PP or ABS, such devices often comprise a switch area molded out of soft elastomeric material, e.g. TPE to form a membrane that allows the actuation of a switch located inside the housing. By overholding the soft component on the hard-plastic housing a waterproof housing assembly can only be achieved, if the right material combination and geometry is selected; sufficient bonding properties between the hard and the soft component are crucial.

However, if a slim overall product design with a housing made from metal having small wall dimensions including a let-in flush switch element is to be provided, a waterproof assembly cannot be ensured by simply over-molding the soft component onto the metal housing as the bonding area would not be sufficiently large (due to the low wall thickness and reduced freedom to design such metal tube housing vs. freeformed plastic parts). The bonding force between the soft switch component and the metal tube housing would not be sufficiently strong to resist peeling stress. Further, no counterforce is provided to hold the soft switch component in place. If a force is applied onto the switch to activate the electrically operated implement, peel stress occurs in the bonding area which significantly weakens the bonding connection. A weakened bonding connection may cause fine cracks or crevices allowing water to enter the inner cavity of the handle metal tube housing.

To enable the provision of a waterproof switch assembly (i.e. a durable and waterproof sealing/bonding between the switch assembly and the metal material) in connection with a metal tube housing having small wall dimensions (e.g. between 0.4 mm and about 1.2 mm) without the need of using separate sealing elements, the present disclosure suggests the use of a switch assembly assembled of a hard switch component and a soft switch component. As the soft switch component is injection molded into the undercut provided between the recess of the hard switch component and the inner wall of the housing, the soft switch component is securely locked and supported from three sides (see FIG. 8 and description provided below). Neither a force applied from the outside of the housing onto the switch component, nor a force applied from the inside of the housing results in significant peel stress on the bonding area as the frame provides a counterforce and holds the soft switch component in place. A switch assembly according to the present disclosure can be seamlessly integrated into the opening in the metal tube housing and can seal the opening in a substantially waterproof manner. Such design prevents water, toothpaste and saliva from entering the housing; a hygienic electrically operated toothbrush can be provided.

The metal wall circumferencing the opening in the housing accommodating the switch assembly may define an angle α between its outer surface and the neighboring surface/side wall of 90° or less. If angle α is less than 90°, the bonding area between the metal wall and the soft switch component is slightly increases which results in improved bonding properties.

For example, the personal care implement may be battery-operated and may comprise a battery to be located in the inner cavity of the handle housing. The electrically operated personal care implement comprising such handle and a head may be an electrically operated toothbrush. The head may be repeatedly attachable to and detachable from the handle. In order to allow for an exchange of the head, the handle may be provided—in a further method step—with a connector comprising a snap-fit locking mechanism. The connector may be inserted into a hollow portion in the head, or the head may comprise a connector insertable into a hollow portion in the handle. Alternatively, a connector may be provided as a further, i.e. separate part of the oral care implement. Such connector may be insertable into a hollow portion in the handle and into a hollow portion the head, respectively, thereby providing sufficiently strong connection and stability between the head and the handle to enable a user to perform a brushing action.

While the high-quality handle of the personal care implement is adapted for use over a longer period of time as compared to common implements, like manual toothbrushes which are discarded after about three months of use, the relatively cheap head/brush refill can be exchanged on a regular basis, e.g. after about three months. This provides a cost-efficient and environmentally sustainable personal care implement providing both, high quality handle solutions as well as cost saving opportunities as only the head has to be exchanged/re-purchased and not the handle.

The metal tube housing may provide an electrically operated personal care product with improved premium consumer delight in contrast to housings made from plastic materials. While the use of metal material drives premium consumer perception and high durability, the handle can be sustainably used over a long period of time. For example, the metal tube housing may be made from stainless steel and/or aluminum. Such materials are highly durable and allow for slim product designs. Beside higher value impression and comfortable haptic, the use of metal material also allows for relatively low wall thicknesses of the housing to enable an overall slim product design. Such slim product design drives premium consumer perception and improved handling properties. A wall thickness of about 0.4 mm to about 1 mm may create a durable metal wall handle, while ensuring high product perception. The thickness of the metal wall may be about 0.4 mm to about 1.2 mm, preferably of about 0.5 mm to about 1 mm. Such slim housing enables users to perform a well-coordinated brushing technique and also improves sensory feeling during brushing.

The frame of the hard switch component may comprise at least two protrusions for precisely positioning/centering the hard switch component onto the inner surface of the metal wall during assembling. Such protrusions to be received by respective recesses provided in the metal tube housing may help to define the position of the hard switch component in respect to the metal tube housing thereby facilitating manufacturing. To this end, the method for manufacturing the handle may comprise the step of positioning the frame of the hard switch component on the inner surface of the metal tube housing by means of at least two protrusions provided on a surface of the frame facing the inner surface and being adapted to be inserted into respective recesses provided in the metal tube housing.

The hard switch component may comprise a lever arm which may extend into the opening provided in the metal wall. The lever arm may comprise a button element, also positioned within the opening. At least a portion of the button element may not be over-molded by the soft switch component. The material of the hard switch component may be provided in a color different from the color of the soft switch component to precisely indicate where the user shall put/rest his finger to activate the switch assembly of the personal care implement.

While the soft switch component may be overmolded and may be made from a soft elastomeric material, preferably from thermoplastic elastomers (TPE), the hard switch component may be manufactured by injection molding from a hard-plastic material, preferably from acrylonitrile butadiene styrene (ABS) and/or acrylonitrile styrene acrylate (ASA).

The hard switch component may be fixed within the housing by means of gluing and/or by other means, including but not limited to substance-to-substance bonds, mechanically interlocking or frictional connections.

To facilitate improved bonding of the glue (if gluing is used for fixing the switch assembly within the housing), the method for manufacturing the handle may further comprise the step of pre-treating the inner surface of the metal tube housing by any of the following methods: laser treatment, plasma treatment, ultraviolet (UV) irradiation treatment, corona treatment, flame treatment and/or by activating the inner surface by removing oxide layers by a blasting process and/or by a sandblast coating process. Further, to provide an even better bonding, a curable resin layer, a coating material layer, and/or a pressure-sensitive non-curable adhesive may be applied onto the surface of the frame of the hard switch component facing the inner surface of the housing.

A method for treating the surface may comprise the following steps: selecting a material of interest to be processed comprising a target surface of interest; determining a surface adhesion transformation of said target surface of interest based on said material's properties, a shape of said target surface of interest, an adhesion material, and required degree of adhesion between said target surface of interest and the others object surface, wherein said material's properties comprise mechanical or chemical interfacial material properties required after application of said method. Studies have shown that such object can be achieved by applying any of the above-mentioned pre-treatment methods.

If the hard switch component is fixed within the housing by means of gluing, the hard switch component may be pressed onto the inner surface of the metal tube housing over a pre-defined period of time depending on the glue used.

The hard switch component can be further supported by a chassis inserted into the inner cavity of the housing. The chassis may comprise a carrier holding components for electrically operating the personal care implement, e.g. a motor, electronics and an energy source, for example a battery.

Further, a metal sheet having magnetic properties may be inserted into the inner cavity of the metal tube housing in a further manufacturing step. Said metal sheet may be formed as a part of the carrier.

Said metal sheet may provide the handle with magnetic/ferromagnetic properties which may allow for hygienic storage of the oral care implement by magnetically attaching the handle to a magnetic holder, e.g. provided at a wall. If the personal care implement is a toothbrush, remaining water, toothpaste slurry and saliva can drain off from the brush. The oral care implement can dry relatively quickly. Consequently, bacteria growth can significantly be reduced, thereby rendering the oral care implement more hygienic. In contrast to a common toothbrush being stored in a toothbrush beaker where drained fluids get collected and accumulated at the bottom of the beaker, the brush according to the present disclosure is exposed to wet conditions over a significantly shorter period of time.

The magnetic holder may have the form of a flat disk attachable to a wall. Such flat disk may represent an easy to clean surface. Further, a user just needs to bring the oral care implement in close proximity to the magnetic holder, and then the oral care implement gets attached automatically. No precise positioning or threading as with common toothbrush holders is required. If the magnetic properties are merely provided in the handle, and not in the head, the head portion cannot accidentally be attached to the magnetic holder, thereby reducing the risk that the magnetic holder gets soiled.

The handle for the electrically operated personal care implement may be provided with pressure compensation means, e.g. a pressure compensation membrane covering a small hole provided e.g. at a distal end of the handle, to prevent any potential explosions. The membrane may be glued onto the inner wall of the housing. Air can exit the inner cavity of the metal tube housing through the membrane, but water cannot enter the inner cavity from the outside.

The handle or part of the handle may get additional decoration in a further manufacturing step, e.g. by brushing, electroplating and/or by physical vapor deposition (PVD) to add improved appearance and a pleasant feel. Thermoplastic elastomers are well suited for electroplating as they allow for the creation of both hard and soft composite components to be electroplated selectively in one operation.

For example, the handle may be provided with a thumb rest being made from a thermoplastic elastomer material and/or from a polypropylene material. These materials can be easily injection molded over the metal tube housing. Such thumb rest may provide the handle with improved handling properties, e.g. with anti-slip properties to improve maneuverability of the personal care implement under wet conditions, e.g. when the user brushes his teeth. The thumb rest may be made from thermoplastic elastomer material having a Shore A hardness from about 30 to about 60, or about 40 to prevent the oral care implement from being too slippery when used in wet conditions. At least a portion of the thumb rest may have a concave shape with an angle α with respect to the area of the remaining portion of the thumb rest from about 20° to about 25°, or about 24°. The thumb rest or a gripping region may be attached onto the front surface of the handle in the region close to the proximal end, i.e. closest to the head. The thumb rest may comprise a plurality of ribs, e.g. extending substantially perpendicular, parallel or diagonal to the longitudinal axis of the oral care implement. Such ribs may allow users/consumers to use the oral care implement with even more control. The user/consumer can better grasp and manipulate the handle of the oral care implement during brushing. Such handle may provide improved control and greater comfort during brushing, in particular under wet conditions.

Thermoplastic elastomer material may form the thumb rest on the front surface of the oral care implement and/or a palm grip on the back surface being opposite the front surface to be gripped by the user's/consumer's fingers and thumb. Such handle configuration may even further resist slippage during use.

If the personal care implement is a toothbrush, tooth cleaning elements, e.g. bundle of filaments forming one or a plurality of tufts, may be attached to the toothbrush head by means of a hot tufting process. One method of manufacturing the head with tufts of filaments embedded in the head may comprise the following steps: In a first step, tufts are formed by providing a desired amount of filaments. In a second step, the tufts are placed into a mold cavity so that ends of the filaments which are supposed to be attached to the head extend into said cavity. The opposite ends of the filaments not extending into said cavity may be either end-rounded or non-end-rounded. For example, the filaments may be not end-rounded in case the filaments are tapered filaments having a pointed tip. In a third step the head is formed around the ends of the filaments extending into the mold cavity by an injection molding process, thereby anchoring the tufts in the head. Alternatively, the tufts may be anchored by forming a first part of the head—a so called "sealplate"—around the ends of the filaments extending into the mold cavity by an injection molding process before the remaining part of the oral care implement is formed. Before starting the injection molding process the ends of the tufts extending into the mold cavity may be optionally melted or fusion-bonded to join the filaments together in a fused mass or ball so that the fused masses or balls are located within the cavity. The tufts may be held in the mold cavity by a mold bar having blind holes that correspond to the desired position of the tufts on the finished head of the oral care implement. In other words, the tufts attached to the head by means of a hot tufting process are not doubled over a middle portion along their length and are not mounted in the head by using an anchor/staple. The tufts are mounted on the head by means of an anchor-free tufting process.

Alternatively, the head for the oral care implement may be provided with a bristle carrier having at least one tuft hole, e.g. a blind-end bore. A tuft comprising a plurality of filaments may be fixed/anchored in said tuft hole by a stapling process/anchor tufting method. This means, that the filaments of the tuft are bent/folded around an anchor, e.g. an anchor wire or anchor plate, for example made of metal, in a substantially U-shaped manner. The filaments together with the anchor are pushed into the tuft hole so that the anchor penetrates into opposing side walls of the tuft hole thereby anchoring/fixing/fastening the filaments to the bristle carrier. The anchor may be fixed in opposing side walls by positive and frictional engagement. In case the tuft hole is a blind-end bore, the anchor holds the filaments against a bottom of the bore. In other words, the anchor may lie over the U-shaped bend in a substantially perpendicular manner. Since the filaments of the tuft are bent around the anchor in a substantially U-shaped configuration, a first limb and a second limb of each filament extend from the bristle carrier in a filament direction. Filament types which can be used/are suitable for usage in a stapling process are also called "two-sided filaments". Heads for oral care implements which are manufactured by a stapling process can be provided in a relatively low-cost and time-efficient manner.

The following is a non-limiting discussion of example embodiments of oral care implements and parts thereof in accordance with the present disclosure, where reference to the Figures is made.

FIG. 1 shows a personal care implement 10, in this specific embodiment an electrically operated oral care implement, i.e. toothbrush 10. Toothbrush 10 comprises a handle 12 and a head 14, the head 14 being repeatedly attachable to and detachable from the handle 12, e.g. by means of connector 16. The connector 16 may be made from stainless steel and/or plastic material with or without glass-fibers. The connector 16 may comprise a spring-loaded ball element comprising a ball and a spring, the spring applying a radial force onto the ball in a direction towards an outer lateral surface of the connector. The ball may be received by a recess provided within a cavity of the head 14. The connector may be inserted into the inner cavity of the handle and fixed therein e.g. by gluing, welding and/or press-fitting. Alternatively, the connector 16 may be inserted into the inner cavity mounted to the handle thereby providing some degree of movement of the connector in relation to the housing to allow the use of a pressure sensor.

The handle comprises a switch assembly 24 located in the housing for activating an energy source accommodated within the handle 12 so that the electrical toothbrush 10 is operational. Electrical toothbrush 10 can be switched in an ON/OFF status by actuating the switch assembly 24.

Figure 2:
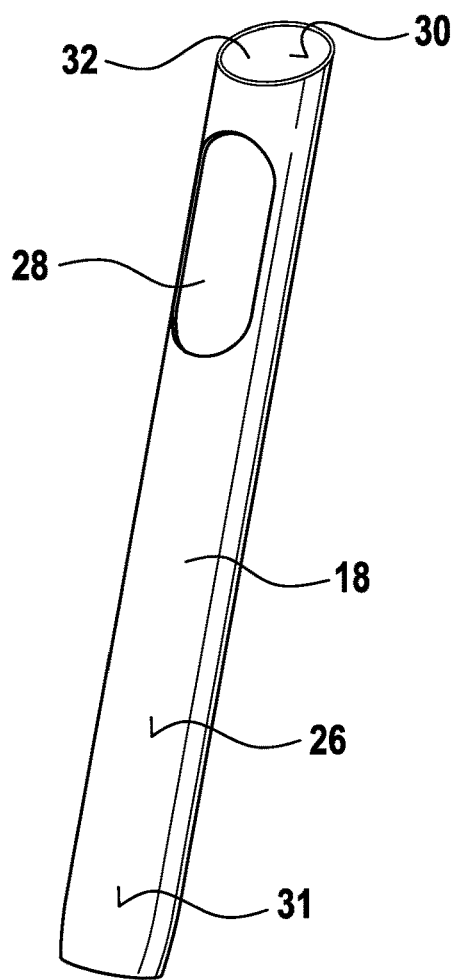
FIG. 2 shows a perspective view of the metal tube housing of FIG. 1.
Figure 3:
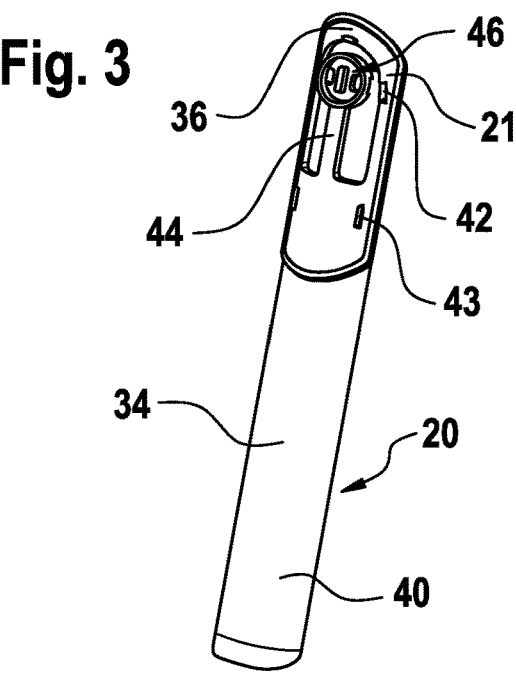
FIG. 3 shows a perspective view of a hard switch component of the switch assembly of FIG. 1.
Figure 4:
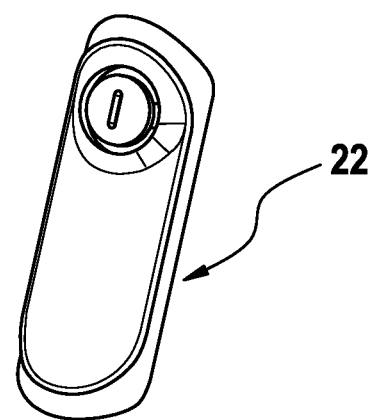
FIG. 4 shows a perspective view of a soft switch component of the switch assembly of FIG. 1.
Figure 5:
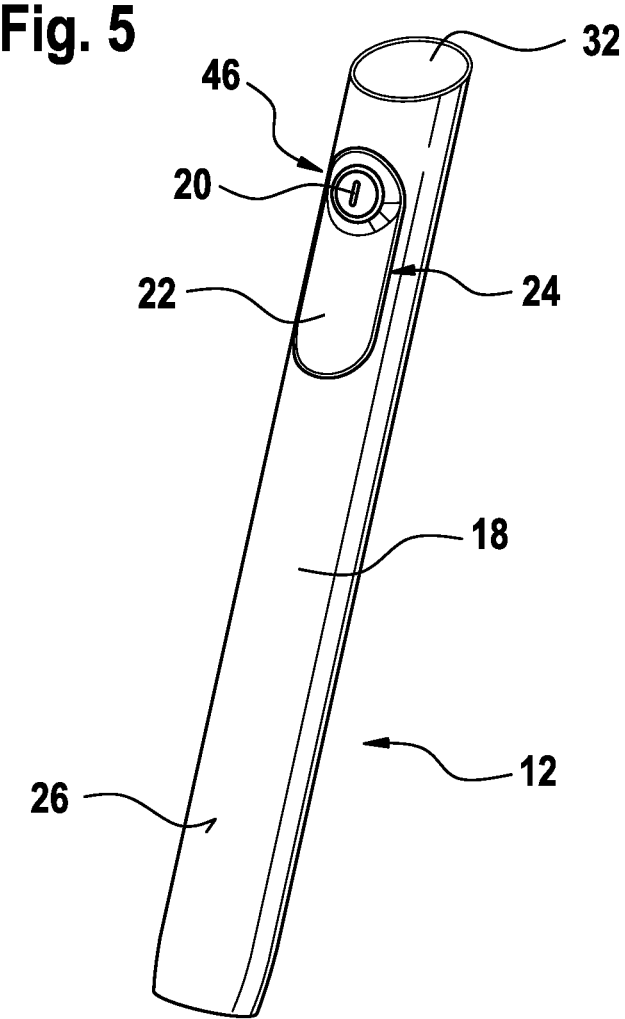
FIG. 5 shows a perspective view of the metal tube housing of FIG. 2, the hard switch component of FIG. 3, and the soft switch component of FIG. 4 in an assembled state.
Figure 6:
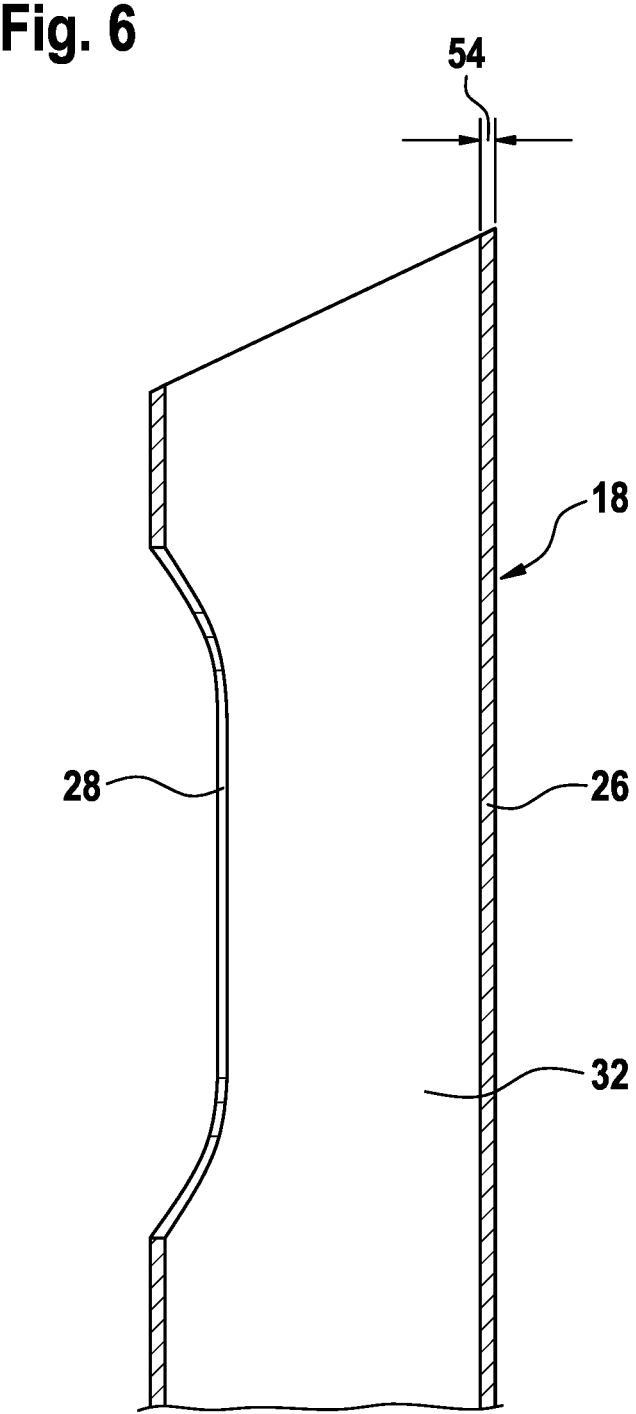
FIG. 6 shows a cross sectional view of the metal tube housing of FIG. 2.

The housing of the handle 12 comprises substantially three parts as shown in FIGS. 2, 3 and 4, respectively: a metal tube housing 18 (FIG. 2), a hard switch component 20 (FIG. 3), and a soft switch component 22 (FIG. 4). FIG. 5 shows the metal tube housing 18, the hard and the soft switch component 20, 22 in an assembled state.

As derivable from FIG. 2, the metal tube housing 18 is made from a metal wall 26 provided with an opening 28 for receiving the switch assembly 24. The metal wall 26 has an inner surface 30 which defines an inner cavity 32 for accommodating the energy source, e.g. a battery. The metal tube housing 18 may be made from stainless steel and/or aluminum to provide high durability as well as high quality perception and appearance of the overall product. The metal wall 26 may have a thickness 54 (extending from the inner surface 30 and an outer surface 31) of about 0.4 mm to about 1.2 mm, or of about 0.5 mm to about 1 mm to provide an overall slim product design.

The switch assembly 24 for activating the energy source comprises hard switch component 20 (FIG. 3) and soft switch component 22 (FIG. 4). Both, the hard and the soft switch components 20, 22 are located within the opening 28 provided in the metal wall 26 of the housing 18. The hard and soft switch components 20, 22 are arranged in a manner that the switch assembly 24 seals the opening 28 in a substantially waterproof manner.

While hard switch component 20 may be molded from hard-plastic material, e.g. from acrylonitrile butadiene styrene (ABS) and/or acrylonitrile styrene acrylate (ASA), soft switch component 22 may be made from soft elastomeric material, e.g. from thermoplastic elastomers (TPE). TPE adheres well to metal material as well as to ABS and ASA.

Figure 7:
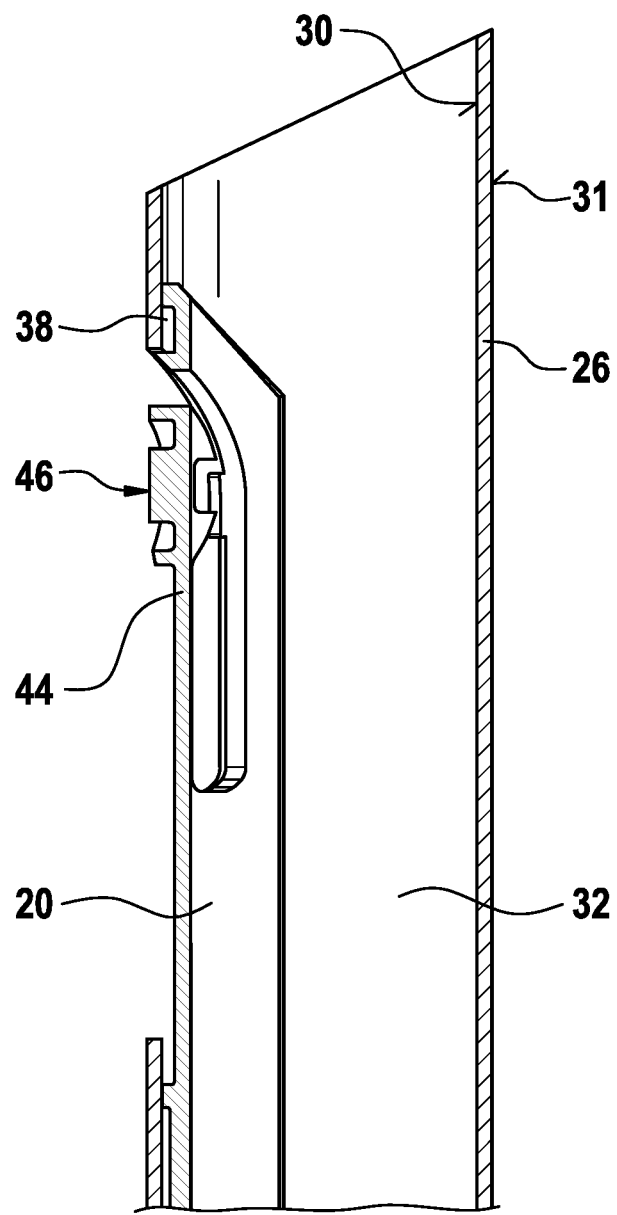
FIG. 7 shows a cross sectional view of the metal tube housing of FIG. 2 and the hard switch component of FIG. 3 in an assembled state.
Figure 8:
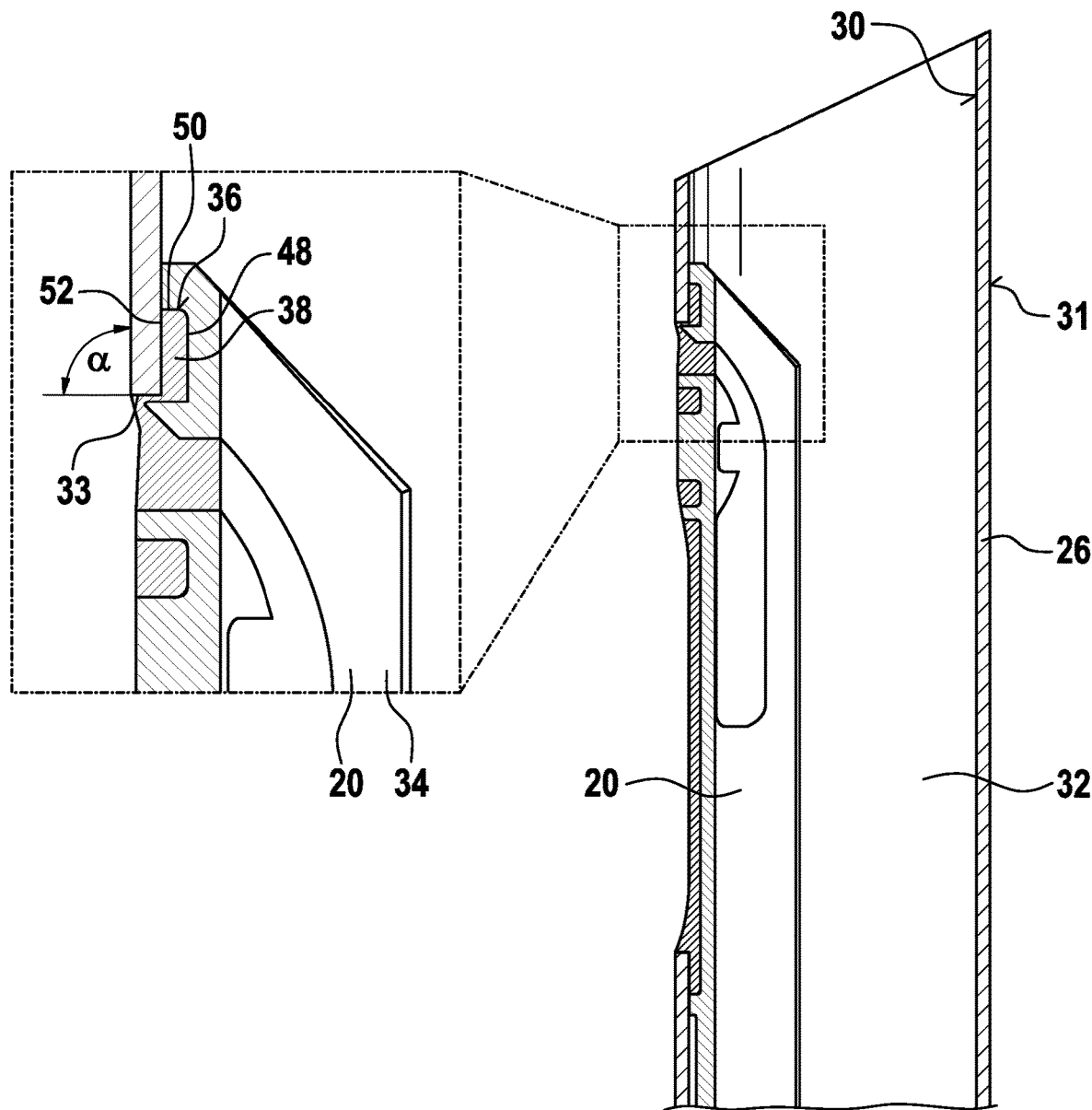
FIG. 8 shows a cross sectional view of FIG. 5.

As shown in FIG. 3, the hard switch component 20 comprises a frame 34 with a recess 36, the frame 34 being attached to the inner surface 30 of the metal wall 26 thereby surrounding/circumferencing the opening 28 in the metal tube housing 18 (see FIGS. 7 and 8).

The recess 36 creates an undercut 38 in which the soft switch component 22 is positioned and securely fixed (see FIG. 8). The hard switch component 20 may be connected to the inner surface 30 of the housing 18 by gluing, i.e. glue may be applied onto area 40 of the frame 34, and then the frame gets connected to the inner surface 30 of housing 18. Fixation of the hard switch component 20 on the inner surface may alternatively be provided by means of substance-to-substance bonds, mechanically interlocking or frictional connections. The frame 34 of the hard switch component 20 may comprise at least two protrusions 42, 43 that help positioning the hard switch component 20 onto the inner surface 30 of the metal wall 26; to this end the inner surface 30 may comprise respective recesses to receive said protrusions 42, 43.

The hard switch component 20 may further comprise a lever arm 44 comprising a button element 46 at the distal end of the lever arm 44. The lever arm 44 and the button element 46 may extend into the opening 28 of the metal wall 26.

The material forming the softs witch component 22 may be overmolded over the lever arm 44 and partially over the button element 46 thereby keeping a portion of the button element 46 exposed to provide an indication where a user should place his finger to activate switch assembly 24. To this end, the color of the material of the hard switch component 20 and the color of the material of the soft switch component 22 may be different to provide a clear and easily visible indication. The material of the soft switch component 22 covers any remaining open area of the opening 28 and is fixed in the undercut 38 provided between recess 36 and inner surface 30 of metal wall 26.

To further strengthen the bonding properties between the material of the soft switch component 22 and the metal wall 26 by slightly increasing the bonding area, the metal wall 26 surrounding the opening 28 may define an angle α between the outer surface 31 and the neighboring surface 33 of 90° or less.

The housing assembly comprising the metal tube housing 18, the hard and soft switch components 20, 22 allows for solid anchoring of the soft switch component 22. The recess 36 of the hard switch component 20 together with the inner surface 30 creates a defined undercut, i.e. cavity that can be filled with the material of the soft switch component 22 during a molding process. The recess facilitates bonding of the soft switch component 22 on three sides 48, 50, 52. Neither a force applied from the outside of the handle, nor a force applied from the inside onto the soft switch component 22 results in peel stress as the frame of the hard switch component 20 holds the softs witch component 22 in place. By over-molding the soft switch component 22, a substantially waterproof and durable seal can be provided which may prevent water, toothpaste and/or saliva from entering the inside/inner cavity 32 of the housing 18.

Figure 11:
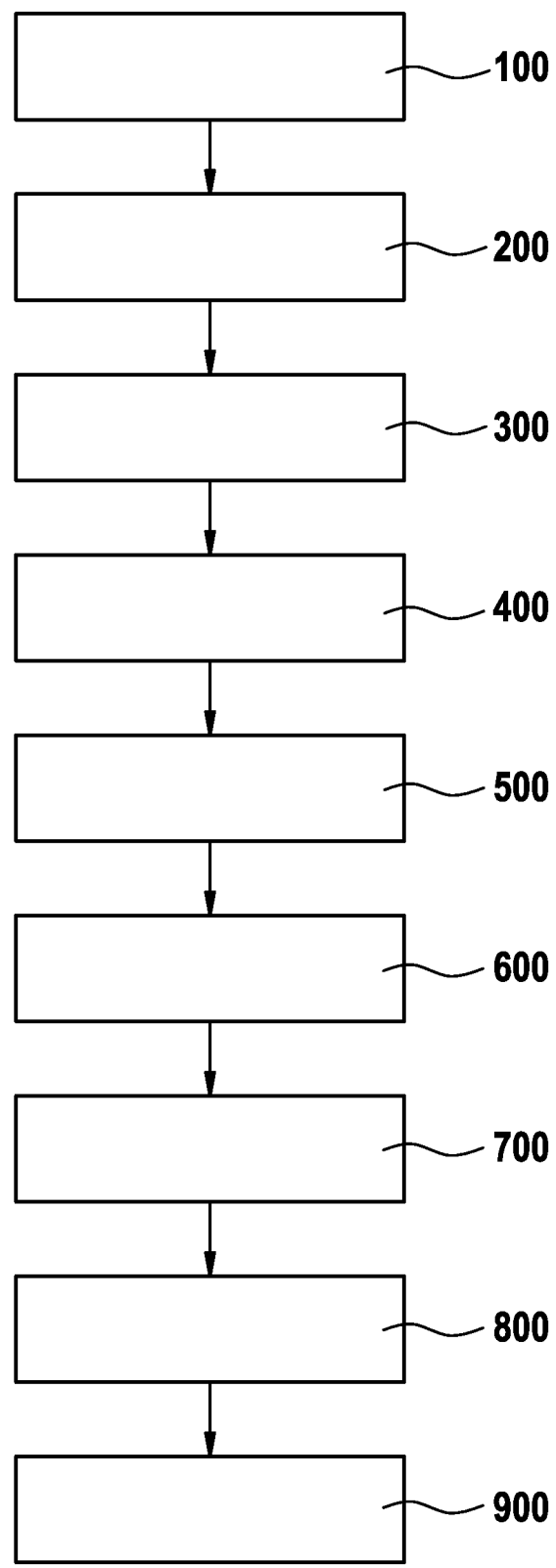
FIG. 11 shows the method steps for manufacturing a handle for an electrically operated personal care implement according to FIG. 1.

FIG. 11 shows the method steps for manufacturing the handle 12 for the electrically operated personal care implement 10 according to FIG. 1.

In a first step 100, a metal tube housing 18 according to FIG. 2 is provided, the housing 18 having a metal wall 26 with an opening 28 and an inner surface 30, the inner surface 30 defining an inner cavity for accommodating an energy source. The opening 28 may be provided by laser cutting.

In a second step 200, a hard switch component 20 according to FIG. 3 is provided by means of injection molding, the hard switch component comprising a frame 34 with a recess.

In a third step 300, the inner surface 30 of the metal tube housing 18 is pre-treating by any of the following methods: laser treatment, plasma treatment, ultraviolet (UV) irradiation treatment, corona treatment, flame treatment and/or by activating the inner surface by removing oxide layers by a blasting process and/or by a sandblast coating process.

In a fourth step 400, a curable resin layer, a coating material layer, and/or a pressure-sensitive non-curable adhesive is applied onto the surface of the frame 34 facing the inner surface 30 of the housing 18.

In a fifth step 500, the frame 34 of the hard switch component 20 is attached to the inner surface 30 of the metal wall 26 by gluing, the frame 34 surrounding the opening 28 and providing an undercut 38 between the recess 36 and the inner surface 30 the undercut 38 being open towards the opening 28. The frame 34 of the hard switch component 20 gets positioned on the inner surface 30 of the metal tube housing 18 by means of at least two protrusions 42, 43 provided on a surface of the frame 34 facing the inner surface 30 and being adapted to be inserted into respective recesses provided in the metal tube housing 18.

In a sixth step 600, the hard switch component 20 is pressed onto the inner surface 30 of the metal tube housing 18 over a pre-defined period of time.

Figure 9:
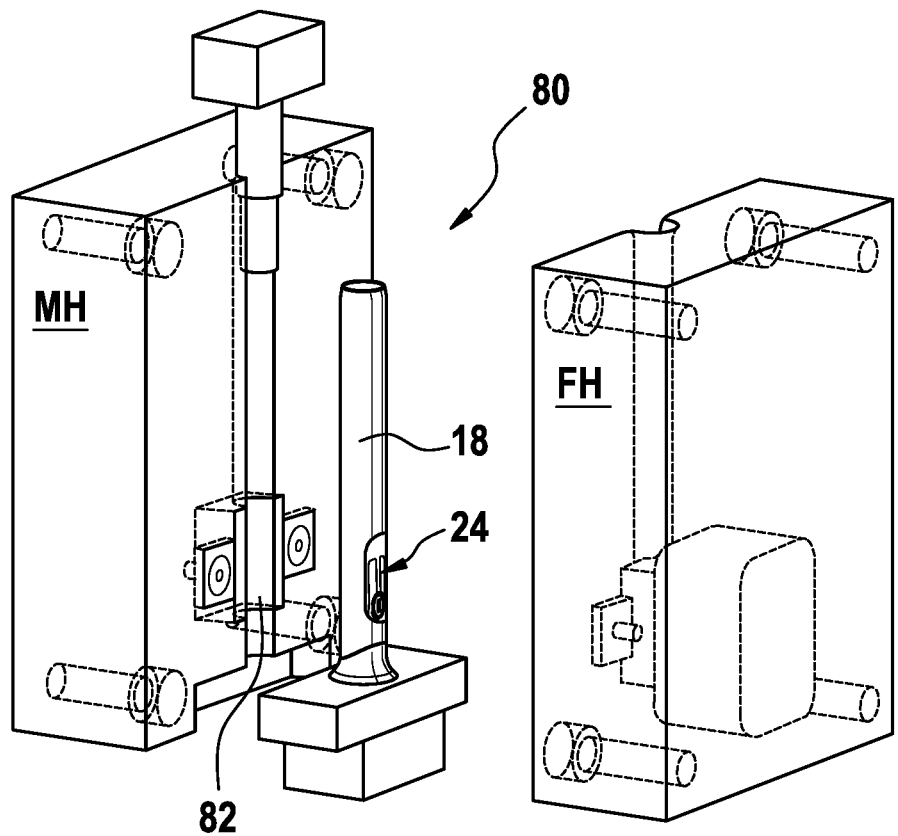
FIG. 9 shows a perspective view of a mold for over-molding the soft switch component to form the switch assembly.
Figure 10:
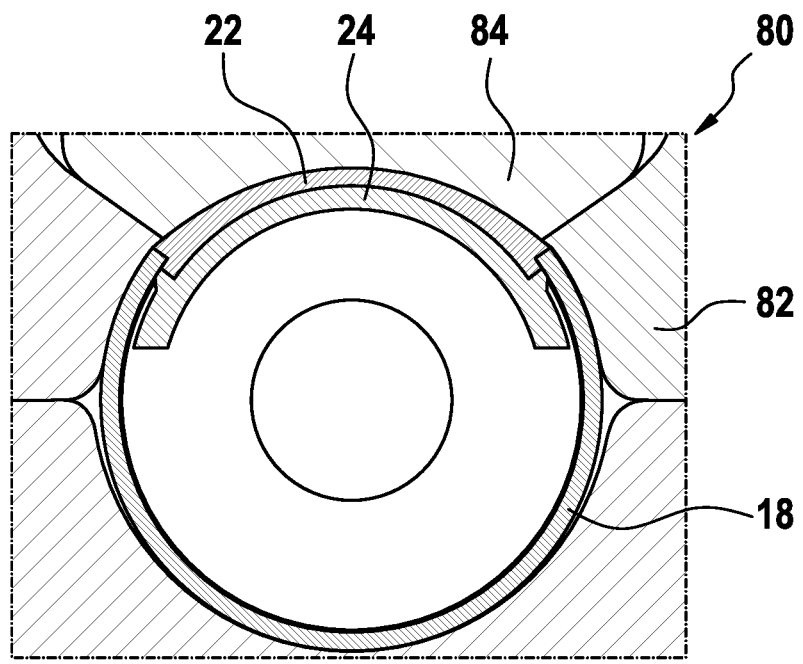
FIG. 10 shows a cross sectional view of the mold of FIG. 9.

In a seventh step 700, the metal tube housing 18 with the hard switch component 20 attached thereto is inserted into an injection mold 80, the injection mold 80 comprising a mold insert 82 to prevent any damage to the housing 18 when the mold is getting closed. The mold insert has a hardness being lower than the hardness of the metal tube material. For example, the mold insert may be made from brass or from a soft elastic material. The insert may be provided at least in the area where the mold touches the metal tube. FIG. 9 shows a perspective view of the mold 80 for over-molding the soft switch component 22 to form the switch assembly 24. FIG. 10 shows a cross sectional view of the mold 80 of FIG. 9 with the soft switch component 22 being overmolded and injection nozzle insert 84.

In an eighth step 800, the opening 28 is at least partially over-molding to form a soft switch component 22 according to FIG. 4, the soft switch component 22 being accommodated in the undercut 38 thereby forming with the hard switch component 20 a switch assembly 24 for activating the energy source, the switch assembly 24 sealing the opening 28 from the inner surface 30 of the metal wall 26.

In a ninth step 900, a metal sheet having magnetic properties is inserted into the inner cavity of the metal tube housing 18 to provide the handle 12 with magnetic properties.

In the context of this disclosure, the term "substantially" refers to an arrangement of elements or features that, while in theory would be expected to exhibit exact correspondence or behavior, may, in practice embody something slightly less than exact. As such, the term denotes the degree by which a quantitative value, measurement or other related representation may vary from a stated reference without resulting in a change in the basic function of the subject matter at issue.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for manufacturing a handle (12) for an electrically operated personal care implement (10), the method comprising the following steps:
   providing a metal tube housing (18), the housing (18) having a metal wall (26) with an opening (28) and an inner surface (30), the inner surface (30) defining an inner cavity (32) for accommodating an energy source,
   providing a hard switch component (20) comprising a frame (34) with a recess (36),
   attaching the frame (34) of the hard switch component (20) to the inner surface (30) of the metal wall (26), the frame (34) surrounding the opening (28) and providing an undercut (38) between the recess (36) and the inner surface (30), the undercut (38) being open towards the opening (28),
   at least partially over-molding the opening (28) to form a soft switch component (22), the soft switch component (22) being accommodated in the undercut (38) thereby forming with the hard switch component (20) a switch assembly (24) for activating the energy source, the switch assembly (24) sealing the opening (28) from the inner surface (30) of the metal wall (26).

2. The method of claim 1, wherein the switch assembly (24) accommodated within the opening (28) seals the opening (28) in a substantially waterproof manner.

3. The method of claim 1, wherein the metal tube housing (18) is made from stainless steel and/or aluminum.

4. The method of claim 1, wherein the opening (28) is provided within the metal tube housing (18) by laser cutting.

5. The method of claim 1, further comprising the step of pre-treating the inner surface (30) of the metal tube housing (18) by any of the following methods: laser treatment, plasma treatment, ultraviolet (UV) irradiation treatment, corona treatment, flame treatment and/or by activating the inner surface (30) by removing oxide layers by a blasting process and/or by a sandblast coating process.

6. The method of claim 1, further comprising the step of applying a curable resin layer, a coating material layer, and/or a pressure-sensitive non-curable adhesive onto a surface of the frame (34) facing the inner surface (30).

7. The method of claim 1, wherein the hard switch component (20) is made from a hard-plastic material, comprising acrylonitrile butadiene styrene (ABS) and/or acrylonitrile styrene acrylate (ASA).

8. The method of claim 1, wherein the hard switch component (20) is manufactured by injection molding.

9. The method of claim 1, wherein the soft switch component (22) is made from a soft elastomeric material comprising thermoplastic elastomers (TPE).

10. The method of claim 1, wherein the frame (34) of the hard switch component (20) is attached onto the inner surface (30) of the metal tube housing (18) by gluing.

11. The method of claim 10, further comprising the step of pressing the hard switch component (20) onto the inner surface (30) of the metal tube housing (18) over a predefined period of time.

12. The method of claim 1, further comprising the step of positioning the frame (34) of the hard switch component (20) on the inner surface (30) of the metal tube housing (18) by means of at least two protrusions (42, 43) provided on a surface of the frame (34) facing the inner surface (30) and being adapted to be inserted into respective recesses provided in the metal tube housing (18).

13. The method of claim 1, further comprising the step of inserting a metal sheet having magnetic properties into the inner cavity of the metal tube housing (18).

14. The method of claim 1, further comprising the step of inserting the metal tube housing (18) with the attached hard switch component (20) into an injection mold (80) before the soft switch component (22) is over-molded, the injection mold (80) comprising a mold insert (82), the mold insert (82) having a hardness being lower than the hardness of the material of the metal tube housing (18).

\* \* \* \* \*